(12) United States Patent
Satoya et al.

(10) Patent No.: US 11,761,583 B2
(45) Date of Patent: Sep. 19, 2023

(54) TANK AND METHOD OF MANUFACTURING THE SAME

(71) Applicant: TOYOTA JIDOSHA KABUSHIKI KAISHA, Toyota (JP)

(72) Inventors: Daisuke Satoya, Nisshin (JP); Koji Katano, Toyota (JP); Takeshi Ishikawa, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/662,171

(22) Filed: May 5, 2022

(65) Prior Publication Data

US 2022/0412508 A1     Dec. 29, 2022

(30) Foreign Application Priority Data

Jun. 23, 2021    (JP) ................................. 2021-103973

(51) Int. Cl.
     *F17C 1/06*      (2006.01)
(52) U.S. Cl.
     CPC ........ *F17C 1/06* (2013.01); *F17C 2201/0109* (2013.01); *F17C 2203/012* (2013.01); *F17C 2203/0604* (2013.01); *F17C 2203/067* (2013.01); *F17C 2203/0621* (2013.01); *F17C 2203/0665* (2013.01); *F17C 2203/0673* (2013.01); *F17C 2209/2163* (2013.01); *F17C 2221/012* (2013.01)
(58) Field of Classification Search
     CPC ................ F17C 1/06; F17C 2201/0109; F17C 2203/012; F17C 2203/0604; F17C 2203/0621; F17C 2203/0665; F17C 2203/067; F17C 2203/0673; F17C 2221/012

USPC ......................................................... 220/590
See application file for complete search history.

(56) References Cited

U.S. PATENT DOCUMENTS 7,556,171 B2 * 7/2009 Ishimaru ................... F17C 1/16
     220/601
2011/0143222 A1    6/2011 Oelerich et al.
(Continued)

FOREIGN PATENT DOCUMENTS

CN      102097635 A     6/2011
JP      2004150525 A     5/2004
(Continued)

OTHER PUBLICATIONS

English Machine Translation of RU-2748287-C1 to Katano (Year: 2021).*

*Primary Examiner* — John K Fristoe, Jr.
*Assistant Examiner* — Laura E. Parker
(74) *Attorney, Agent, or Firm* — HUNTON ANDREWS KURTH LLP

(57) ABSTRACT

A tank includes a liner that includes a barrel portion in a cylindrical shape and a pair of dome portions provided at both ends of the barrel portion in the axial direction, and a reinforcing layer that covers the liner and that is formed from a fiber reinforced resin formed by impregnating a fiber bundle with a resin. A portion of the reinforcing layer that covers the dome portions includes a radial arrangement layer in which fibers of the fiber bundle are arranged radially along the radial direction of the dome portions when seen in the direction of an axis of the tank.

6 Claims, 10 Drawing Sheets

(56) References Cited

U.S. PATENT DOCUMENTS

| | | | |
|---|---|---|---|
| 2012/0234840 A1* | 9/2012 | Strassburger | B29C 70/24 156/196 |
| 2018/0356037 A1* | 12/2018 | Yokoi | F17C 13/06 |
| 2020/0309320 A1 | 10/2020 | Ueda | |
| 2021/0197499 A1 | 7/2021 | Katano | |
| 2021/0237335 A1* | 8/2021 | Shindo | F17C 1/16 |
| 2021/0293380 A1* | 9/2021 | Fujii | F17C 1/06 |

FOREIGN PATENT DOCUMENTS

| | | | | |
|---|---|---|---|---|
| JP | 2019527321 A | | 9/2019 | |
| JP | 2020169656 A | | 10/2020 | |
| JP | 2021102994 A | | 7/2021 | |
| RU | 2748287 C1 | * | 5/2021 | B29C 70/16 |
| WO | WO-2013168080 A1 | * | 11/2013 | B29C 70/086 |
| WO | 2018007367 A1 | | 1/2018 | |
| WO | WO-2018007367 A1 | * | 1/2018 | F17C 1/06 |
| WO | WO-2021177953 A1 | * | 9/2021 | F17C 1/06 |

* cited by examiner

TANK AND METHOD OF MANUFACTURING THE SAME

CROSS-REFERENCE TO RELATED APPLICATION

This application claims priority to Japanese Patent Application No. 2021-103973 filed on Jun. 23, 2021, incorporated herein by reference in its entirety.

BACKGROUND

1. Technical Field

The present disclosure relates to a tank and a method of manufacturing the same.

2. Description of Related Art

A tank that includes a liner and a reinforcing layer is known as a tank to be mounted on a fuel cell electric vehicle. The liner includes a barrel portion in a cylindrical shape and a pair of dome portions provided at both ends of the barrel portion in the axial direction. The reinforcing layer covers the liner, and includes a fiber reinforced resin that is formed by impregnating a fiber bundle with a resin. To manufacture a tank with such a structure, a liner is first formed. Next, a reinforcing layer is formed by winding a fiber bundle impregnated with a resin around the outer peripheral surface of the liner by a filament winding method (FW method) using the liner as a winding core. In forming a reinforcing layer by the FW method, a fiber bundle is hoop-wound around the barrel portion of the liner to form a hoop layer. Further, a fiber bundle is helically wound so as to cover the formed hoop layer and the entire liner to form a helical layer (see Japanese Unexamined Patent Application Publication No. 2020-169656 (JP 2020-169656 A), for example).

SUMMARY

In a tank such as that according to JP 2020-169656 A, the strength of the barrel portion is secured by the hoop layer, and the strength of the dome portions is secured by the helical layer. That is, even if the helical layer is provided on the barrel portion, the helical layer provided on the barrel portion hardly contributes to reinforcing the barrel portion. When a continuous fiber bundle is wound around the liner so as to reciprocate between both end portions of the liner by helical winding, however, the fiber bundle inevitably passes through the barrel portion. If the helical layer is formed also on the barrel portion in this manner, the amount of the fiber reinforced resin is used wastefully.

The present disclosure provides a tank formed using a reduced amount of a fiber reinforced resin and a method of manufacturing the same.

An aspect of the present disclosure provides a tank including: a liner that includes a barrel portion having a cylindrical shape and a pair of dome portions provided at both ends of the barrel portion in an axial direction; and a reinforcing layer that covers the liner and that is formed from a fiber reinforced resin formed by impregnating a fiber bundle with a resin, in which a portion of the reinforcing layer that covers the dome portions includes a radial arrangement layer in which fibers of the fiber bundle are arranged radially along a radial direction of the dome portions when seen in a direction of an axis of the tank.

In the tank according to the present disclosure, a portion of the reinforcing layer that covers the dome portions includes a radial arrangement layer in which fibers of the fiber bundle are arranged radially along a radial direction of the dome portions when seen in a direction of an axis of the tank. Therefore, the dome portions can be reinforced by the radial arrangement layer, and it is not necessary to form the helical layer on the barrel portion along with formation of the helical layer for reinforcing the dome portions, for example. That is, since the dome portions can be reinforced by forming the radial arrangement layer, it is possible to reduce the amount of the fiber reinforced resin to be used compared to when the dome portions are reinforced only by the helical layer, for example.

In the tank according to the present disclosure, the reinforcing layer may include a circumferential arrangement layer that covers the barrel portion and in which fibers of the fiber bundle are arranged in a circumferential direction of the tank, and a helical layer that covers the circumferential arrangement layer and the dome portions, and the radial arrangement layer is disposed on an outer side of a portion of the helical layer that covers the dome portions. In this manner, the barrel portion can be reinforced using the circumferential arrangement layer. In addition, the radial arrangement layer is disposed on the outer side of the helical layer, and thus it is possible to suppress the occurrence of a step between the circumferential arrangement layer and the helical layer. As a result, it is possible to improve the strength of the tank.

In the tank according to the present disclosure, the radial arrangement layer may covers the dome portions, and the reinforcing layer may include a circumferential arrangement layer that covers the barrel portion and in which fibers of the fiber bundle are arranged in a circumferential direction of the tank, and a helical layer that covers the circumferential arrangement layer and the radial arrangement layer. In this manner, the barrel portion can be reinforced using the circumferential arrangement layer. In addition, the radial arrangement layer is disposed on the inner side of the helical layer, and thus it is possible to enhance the adhesion between the radial arrangement layer and the dome portions.

In the tank according to the present disclosure, a protector may be disposed on an outer side of the radial arrangement layer. In this manner, it is possible to improve the impact resistance properties of the tank.

Another aspect of the present disclosure provides a method of manufacturing a tank, including: forming a liner that includes a barrel portion having a cylindrical shape and a pair of dome portions provided at both ends of the barrel portion in an axial direction; and forming a reinforcing layer that covers the liner using a fiber reinforced resin formed by impregnating a fiber bundle with a resin, in which the forming of the reinforcing layer includes forming a radial arrangement layer on an outer side of the dome portions, in which fibers of the fiber bundle are arranged radially along a radial direction of the dome portions when seen in an axial direction of the tank.

In the method of manufacturing a tank according to the present disclosure, the forming of the reinforcing layer includes forming a radial arrangement layer on an outer side of the dome portions, in which fibers of the fiber bundle are arranged radially along a radial direction of the dome portions when seen in an axial direction of the tank. By forming the radial arrangement layer in this manner, the dome portions can be reinforced, and it is not necessary to form the helical layer on the barrel portion along with formation of the helical layer for reinforcing the dome portions. That is, since the dome portions can be reinforced by forming the radial arrangement layer, it is possible to reduce the amount of the fiber reinforced resin to be used compared to when the dome portions are reinforced only by the helical layer, for example.

In the method of manufacturing a tank according to the present disclosure, the radial arrangement layer may be formed by a tape placement method. It is occasionally difficult to form the radial arrangement layer by the filament winding method. Therefore, the radial arrangement layer can be formed easily by using the tape placement method in place of the filament winding method.

In the method of manufacturing a tank according to the present disclosure, the radial arrangement layer may be formed by thermocompression bonding of tapes formed from the fiber reinforced resin. In this manner, the resin with which the fiber bundle of the tapes is impregnated can be cured at the same time as the tapes are applied, and thus the radial arrangement layer can be formed efficiently.

In the method of manufacturing a tank according to the present disclosure, the tank may include a protector disposed on an outer side of the radial arrangement layer; and the forming of the radial arrangement layer may include applying tapes formed from the fiber reinforced resin to an inner surface of the protector fabricated in advance, such that fibers of the fiber bundle are arranged radially along a radial direction of the dome portions when seen in a direction of an axis of the tank to be manufactured, mounting the protector, to which the tapes have been applied, to an outer side of the liner, and curing the resin with which the fiber bundle is impregnated. In this manner, it is possible to fix the protector to the liner at the same time as the radial arrangement layer is formed. Therefore, it is possible to reduce the number of man-hours for manufacture compared to when the formation of the radial arrangement layer and the fixation of the protector are performed separately. The adhesion between the protector and the liner can be secured compared to when the formation of the radial arrangement layer and the fixation of the protector are performed separately.

In the method of manufacturing a tank according to the present disclosure, the forming of the reinforcing layer may include forming a circumferential arrangement layer that covers the barrel portion and in which fibers of the fiber bundle are arranged in a circumferential direction of the tank, and forming a helical layer that covers the circumferential arrangement layer and the dome portions, and the forming of the radial arrangement layer may include forming the radial arrangement layer on an outer side of the helical layer at positions to cover the dome portions.

In the method of manufacturing a tank according to the present disclosure, the forming of the reinforcing layer may include forming a circumferential arrangement layer, and forming a helical layer, the forming of the circumferential arrangement layer includes forming the circumferential arrangement layer that covers the barrel portion and in which fibers of the fiber bundle are arranged in a circumferential direction of the tank, the forming of the radial arrangement layer may include forming the radial arrangement layer that covers the dome portions, and the forming of the helical layer includes forming the helical layer that covers the circumferential arrangement layer and the radial arrangement layer.

With the present disclosure, it is possible to reduce the amount of the fiber reinforced resin to be used.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A tank and a method of manufacturing the tank according to embodiments of the present disclosure will be described below with reference to the drawings. In the present embodiment, a tank 1 is one to be mounted on a fuel cell electric vehicle and filled with a high-pressure hydrogen gas. However, the tank 1 may be applied for other purposes. The gas to fill the tank 1 is not limited to a high-pressure hydrogen gas. The tank 1 may be filled with various compressed gases such as a compressed natural gas (CNG), various liquefied gases such as a liquefied natural gas (LNG) and a liquefied petroleum gas (LPG), and other gases.

First Embodiment

Figure 1:
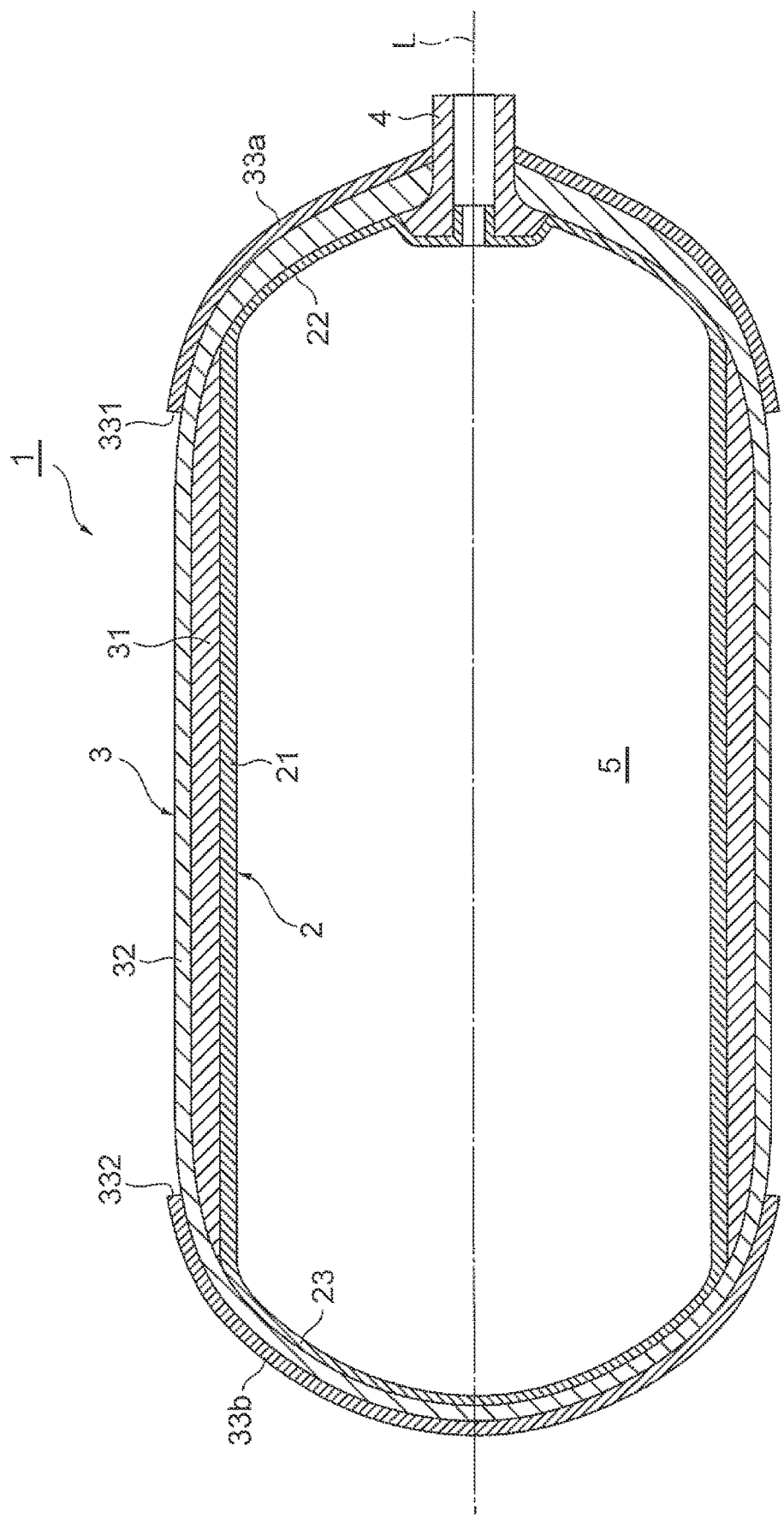
FIG. 1 is a sectional view illustrating the structure of a tank according to a first embodiment.

FIG. 1 is a sectional view illustrating the structure of a tank according to a first embodiment. The tank 1 according to the present embodiment is a high-pressure gas storage container in a generally cylindrical shape rounded in a dome shape at both ends. The tank 1 includes a liner 2 with gas barrier properties, a reinforcing layer 3 that covers the outer surface of the liner 2, and a metal fitting 4 attached to one end portion of the tank 1.

The liner 2 is a hollow container that has a storage space 5 for storing high-pressure hydrogen. The liner 2 is formed from a resin material with gas barrier properties for a hydrogen gas. The liner 2 is composed of a barrel portion 21 in a cylindrical shape and a pair of dome portions (a first dome portion 22 and a second dome portion 23) disposed on both sides of the barrel portion 21. The barrel portion 21 extends for a predetermined length along the direction of an axis L of the tank 1. The first dome portion 22 and the second dome portion 23 are formed to be continuous on both sides of the barrel portion 21. Each of the first dome portion 22 and the second dome portion 23 has a hemispherical shape so as to become smaller in diameter while extending away from the barrel portion 21.

An opening portion is formed at the top portion of the first dome portion 22, of the first dome portion 22 and the second dome portion 23. The metal fitting 4 discussed above is mounted to the opening portion. On the other hand, the second dome portion 23 is not provided with an opening portion or a metal fitting 4.

The liner 2 is formed integrally by a rotary blow molding method using a resin member such as polyethylene and nylon, for example. Alternatively, the liner 2 may be formed by coupling a plurality of members obtained by injection or extrusion molding, instead of an integral molding manufacturing method such as the rotary blow molding method. Further, the liner 2 may be formed from a metal material such as aluminum, instead of a resin member.

The reinforcing layer 3 has a function of improving the mechanical strength such as rigidity and pressure resistance of the tank 1 by reinforcing the liner 2. The reinforcing layer 3 has a plurality of (three in the present embodiment) layers formed from a fiber reinforced resin. The fiber reinforced resin is formed by constituting a fiber bundle by binding fibers with a diameter of about several micrometers and impregnating the fiber bundle with a thermosetting resin, for example. Examples of the fibers include reinforced fibers such as glass fibers, carbon fibers, aramid fibers, alumina fibers, boron fibers, steel fibers, poly(p-phenylene benzobisoxazole) (PBO) fibers, natural fibers, and high-strength polyethylene fibers. Carbon fibers are preferably used as the fibers from the viewpoint of lightweight properties, mechanical strength, etc., in particular. The thermosetting resin may be an epoxy resin, a modified epoxy resin represented by a vinyl ester resin, a phenol resin, a melamine resin, a urea resin, an unsaturated polyester resin, an alkyd resin, a polyurethane resin, and a thermosetting polyimide resin. The fiber bundle may be impregnated with a thermoplastic resin.

In the present embodiment, the reinforcing layer 3 includes a circumferential arrangement layer 31, a helical layer 32, and radial arrangement layers 33a, 33b. The circumferential arrangement layer 31 covers the barrel portion 21 of the liner 2. The circumferential arrangement layer 31 includes a fiber bundle that is a bundle of fibers arranged in the circumferential direction of the tank 1. The helical layer 32 covers the first dome portion 22 and the second dome portion 23 of the liner 2. The radial arrangement layers 33a, 33b are disposed on the outer side of portions of the helical layer 32 that cover the first dome portion 22 and the second dome portion 23.

The circumferential arrangement layer 31 is a fiber reinforced resin layer formed on the outer peripheral surface of the barrel portion 21 of the liner 2. In the circumferential arrangement layer 31, fibers of the fiber bundle are arranged in the circumferential direction of the barrel portion 21 (in other words, the circumferential direction of the tank 1). In the present embodiment, the phrase "arranged in the circumferential direction" means being disposed along the circumference of the tank 1 such that fibers of the fiber bundle are generally perpendicular to the axis L of the tank 1. The phrase "generally perpendicular" means both an angle of 90° and an angle around 90° that may be obtained by shifting the winding position of the fiber bundle such that the fiber bundle does not overlap another.

The circumferential arrangement layer 31 may be a hoop layer. The hoop layer is formed by hoop-winding a fiber bundle impregnated with a resin on the outer peripheral surface of the barrel portion 21 at a winding angle that is generally perpendicular to the axis of the liner 2 (i.e. the axis L of the tank 1), for example. Alternatively, the circumferential arrangement layer 31 may be formed by winding a sheet formed from a fiber reinforced resin on the outer peripheral surface of a mandrel in a circular column shape, for example. In this case, fibers of a fiber bundle of the sheet are arranged on the circumference of the mandrel at an angle that is generally perpendicular to the axial direction of the mandrel.

The helical layer 32 is a fiber reinforced resin layer. The helical layer 32 is formed over the entire liner 2 so as to surround the circumferential arrangement layer 31 and the first dome portion 22 and the second dome portion 23 which are not covered by the circumferential arrangement layer 31. The helical layer 32 is formed by helically winding a fiber bundle impregnated with a resin in the circumferential direction of the tank 1. The winding angle of the fiber bundle is more than 0° and less than 90° with respect to the axis L of the tank 1. Thus, in the helical layer 32, fibers of the fiber bundle are not arranged in the circumferential direction of the tank 1, and are arranged in various directions that intersect the circumferential direction of the tank 1.

The fiber reinforced resin that is used for the circumferential arrangement layer 31 and the fiber reinforced resin that is used for the helical layer 32 may include the same resin and the same fibers, may include different resins and different fibers, may include the same resin and different fibers, or may include different resins and the same fibers.

Meanwhile, the radial arrangement layers 33a, 33b are not formed over the entire liner 2. The radial arrangement layers 33a, 33b are formed on the outer side of the helical layer 32 only at positions corresponding to the first dome portion 22 and the second dome portion 23. The radial arrangement layer 33a corresponding to the first dome portion 22 is also referred to as a "first radial arrangement layer 33a". The radial arrangement layer 33b corresponding to the second dome portion 23 is also referred to as a "second radial arrangement layer 33b".

The first radial arrangement layer 33a has a dome shape, at the center portion of which an opening portion for exposing the metal fitting 4 is provided. The first radial arrangement layer 33a includes an expanded end portion 331 on the opposite side of the opening portion. The expanded end portion 331 extends to a position of coupling between the first dome portion 22 and the barrel portion 21. The expanded end portion 331 preferably extends beyond the position of coupling between the first dome portion 22 and the barrel portion 21 so as to further cover a part of the barrel portion 21. In the first radial arrangement layer 33a, fibers of the fiber bundle are arranged radially along the radial direction of the first dome portion 22 when seen in the direction of the axis L of the tank 1.

The second radial arrangement layer 33b has a dome shape, since a metal fitting 4 is not mounted to the second dome portion 23. The second radial arrangement layer 33b includes an expanded end portion 332. The expanded end portion 332 extends to a position of coupling between the second dome portion 23 and the barrel portion 21. The expanded end portion 332 preferably extends beyond the position of coupling between the second dome portion 23 and the barrel portion 21 so as to further cover a part of the barrel portion 21. In the second radial arrangement layer 33b, fibers of the fiber bundle are arranged radially along the radial direction of the second dome portion 23 when seen in the direction of the axis L of the tank 1.

In the tank 1 according to the present embodiment, the first radial arrangement layer 33a is formed on the outer side of the helical layer 32 at a position corresponding to the first dome portion 22. The second radial arrangement layer 33b is formed on the outer side of the helical layer 32 at a position corresponding to the second dome portion 23. In the first radial arrangement layer 33a, fibers of the fiber bundle are arranged radially along the radial direction of the first dome portion 22 when seen in the direction of the axis L of the tank 1. In the second radial arrangement layer 33b, fibers of the fiber bundle are arranged radially along the radial direction of the second dome portion 23 when seen in the direction of the axis L of the tank 1. Thus, in the tank 1 according to the present embodiment, the first dome portion 22 can be reinforced by the first radial arrangement layer 33a, and the second dome portion 23 can be reinforced by the second radial arrangement layer 33b. In the tank 1 according to the present embodiment, in addition, it is not necessary to form a helical layer on the barrel portion 21 along with formation of a helical layer for reinforcing the dome portions. That is, since the first dome portion 22 can be reinforced by forming the first radial arrangement layer 33a and the second dome portion 23 can be reinforced by forming the second radial arrangement layer 33b, it is possible to reduce the amount of the fiber reinforced resin to be used compared to when the first dome portion 22 and the second dome portion 23 are reinforced only by the helical layer 32, for example.

In addition, the reinforcing layer 3 includes the circumferential arrangement layer 31, the helical layer 32, the first radial arrangement layer 33a, and the second radial arrangement layer 33b. The circumferential arrangement layer 31 covers the barrel portion 21 of the liner 2. The helical layer 32 covers the circumferential arrangement layer 31, the first dome portion 22, and the second dome portion 23. The first radial arrangement layer 33a is disposed on the outer side of a portion of the helical layer 32 that covers the first dome portion 22. The second radial arrangement layer 33b is disposed on the outer side of a portion of the helical layer 32 that covers the second dome portion 23. In this manner, the barrel portion 21 can be reinforced using the circumferential arrangement layer 31. In addition, the first radial arrangement layer 33a and the second radial arrangement layer 33b are disposed on the outer side of the helical layer 32, and thus it is possible to suppress the occurrence of a step between the circumferential arrangement layer 31 and the helical layer 32. From the above, it is possible to further improve the strength of the tank 1.

Figure 2:
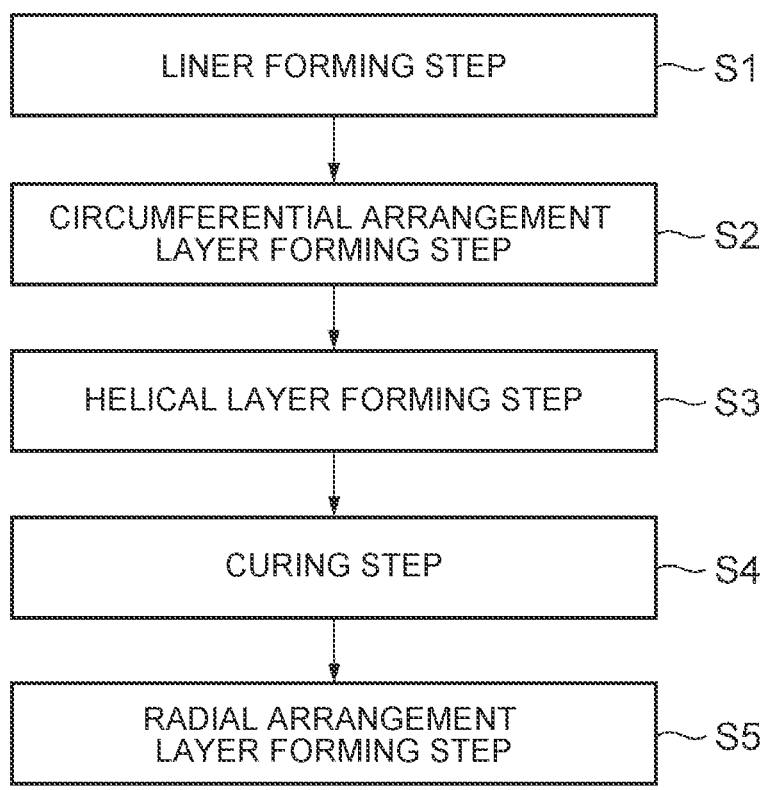
FIG. 2 is a process chart illustrating a method of manufacturing the tank according to the first embodiment.

A method of manufacturing the tank 1 will be described with reference to FIGS. 2 to 6. FIG. 2 is a process chart illustrating a method of manufacturing the tank according to the first embodiment. The method of manufacturing the tank 1 includes a liner forming step S1, a circumferential arrangement layer forming step S2, a helical layer forming step S3, a curing step S4, and a radial arrangement layer forming step S5. The circumferential arrangement layer forming step S2, the helical layer forming step S3, the curing step S4, and the radial arrangement layer forming step S5 can be considered as an embodiment of the "reinforcing layer forming step" according to the present embodiment.

In the liner forming step S1, a liner 2 is formed. The liner 2 includes the barrel portion 21 in a cylindrical shape and the first dome portion 22 and the second dome portion 23 provided at both ends of the barrel portion 21 in the axial direction. Specifically, in the liner forming step S1, a liner 2 made of a resin may be formed using a rotary blow molding method, for example. In the liner forming step S1, alternatively, a liner 2 made of aluminum may be formed by metal working, welding, etc. using an aluminum sheet.

Figure 3:
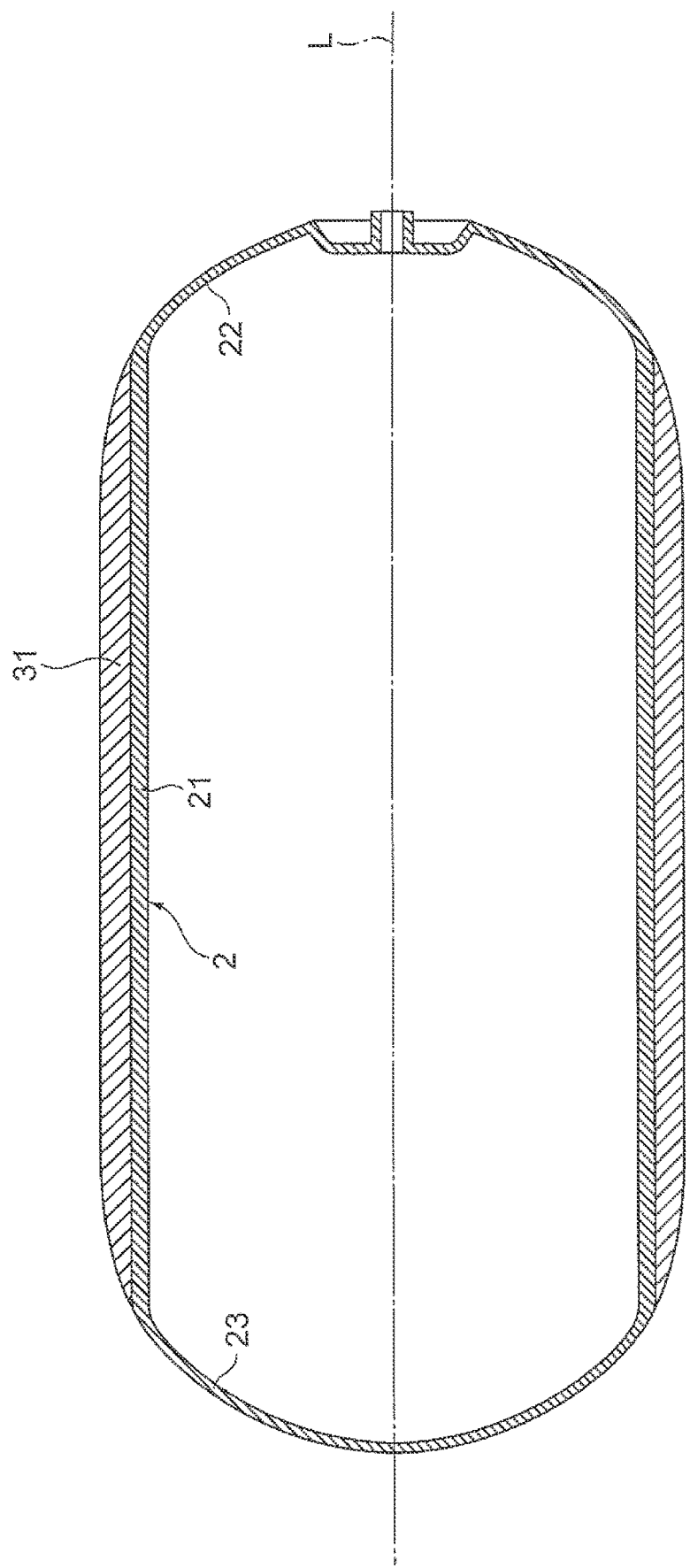
FIG. 3 is a sectional view illustrating a liner forming process and a circumferential arrangement layer forming process.
Figure 4:
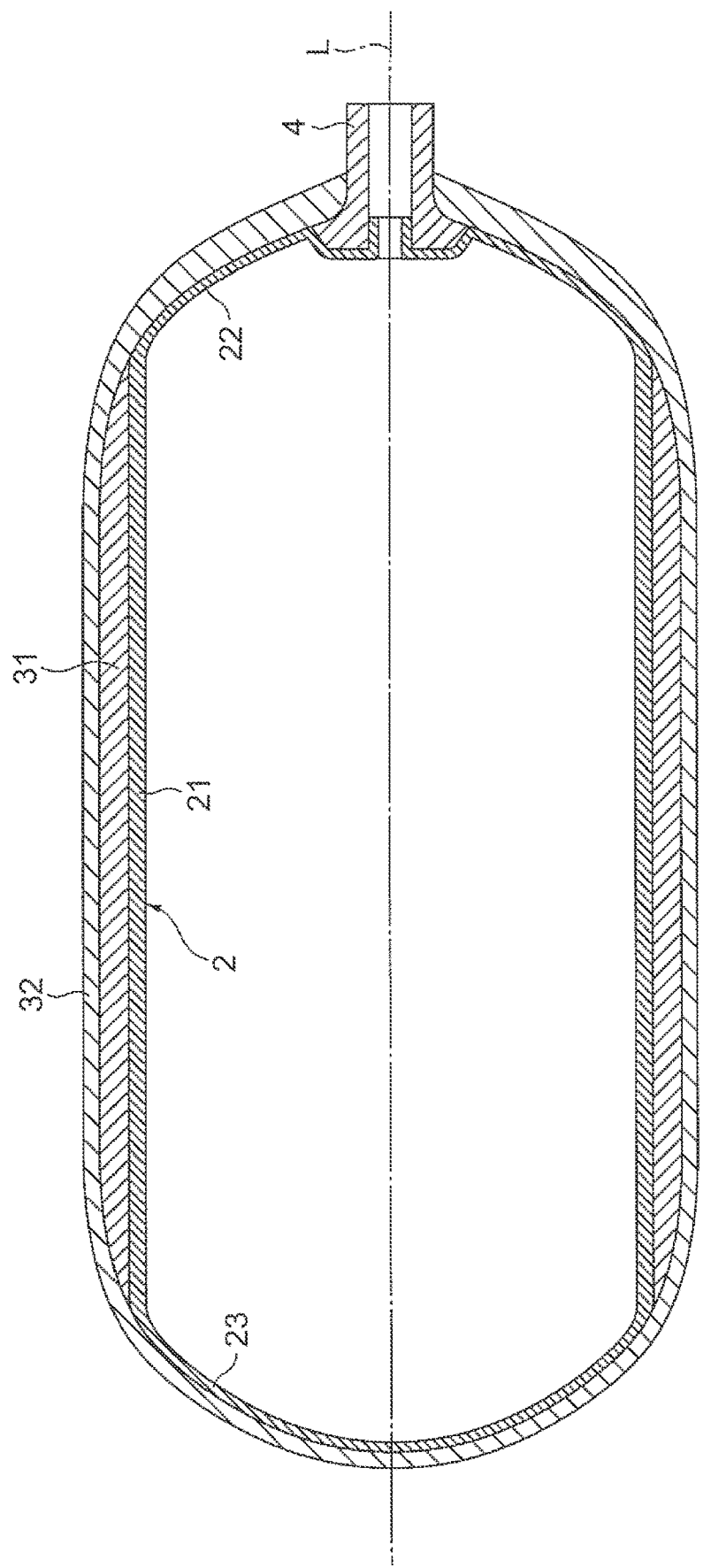
FIG. 4 is a sectional view illustrating a helical layer forming process.

In the circumferential arrangement layer forming step S2, a fiber bundle impregnated with a thermosetting resin (e.g. an epoxy resin) is hoop-wound around the outer peripheral surface of the barrel portion 21 of the liner 2, for example, to form a circumferential arrangement layer 31 (see FIG. 3).

Alternatively, a sheet formed from a fiber reinforced resin may be wound around the outer peripheral surface of a mandrel in a circular column shape such that fibers of the fiber bundle of the sheet are arranged in the circumferential direction of the mandrel, for example, to form a circumferential arrangement layer 31. In this case, it is necessary to insert the liner 2 into the circumferential arrangement layer 31 that has been formed.

In the helical layer forming step S3, first, a metal fitting 4 is mounted to the liner 2 on which the circumferential arrangement layer 31 is formed. Next, a fiber bundle impregnated with a thermosetting resin is helically wound around the circumferential arrangement layer 31, the first dome portion 22, and the second dome portion 23 to form a helical layer 32 (see FIG. 4). The helical layer 32 covers the circumferential arrangement layer 31, the first dome portion 22, and the second dome portion 23.

In the curing step S4, the resin in the circumferential arrangement layer 31 and the helical layer 32 is cured. For example, the liner 2 on which the circumferential arrangement layer 31 and the helical layer 32 are formed is put into a constant-temperature bath and heated at a temperature of about 85° C. to cure the thermosetting resin with which the fiber bundles of the circumferential arrangement layer 31 and the helical layer 32 are impregnated.

In the radial arrangement layer forming step S5, a first radial arrangement layer 33a and a second radial arrangement layer 33b are formed using a tape placement method. Specifically, in the radial arrangement layer forming step S5, a first radial arrangement layer 33a is formed on the outer side of the helical layer 32 and at a position of the helical layer 32 corresponding to the first dome portion 22. In the radial arrangement layer forming step S5, a second radial arrangement layer 33b is formed on the outer side of the helical layer 32 and at a position of the helical layer 32 corresponding to the second dome portion 23. In the radial arrangement layer forming step S5 in which the tape placement method is used, the first radial arrangement layer 33a is formed by thermocompression bonding of tapes 6 formed from a fiber reinforced resin to the first dome portion 22, for example. In the thermocompression bonding, fibers of the fiber bundle of the tapes 6 are arranged radially along the radial direction of the first dome portion 22 when seen in the direction of the axis L of the tank 1. In the radial arrangement layer forming step S5 in which the tape placement method is used, the second radial arrangement layer 33b is formed by thermocompression bonding of tapes 6 formed from a fiber reinforced resin to the second dome portion 23, for example. In the thermocompression bonding, fibers of the fiber bundle of the tapes 6 are arranged radially along the radial direction of the second dome portion 23 when seen in the direction of the axis L of the tank 1.

Figure 5:
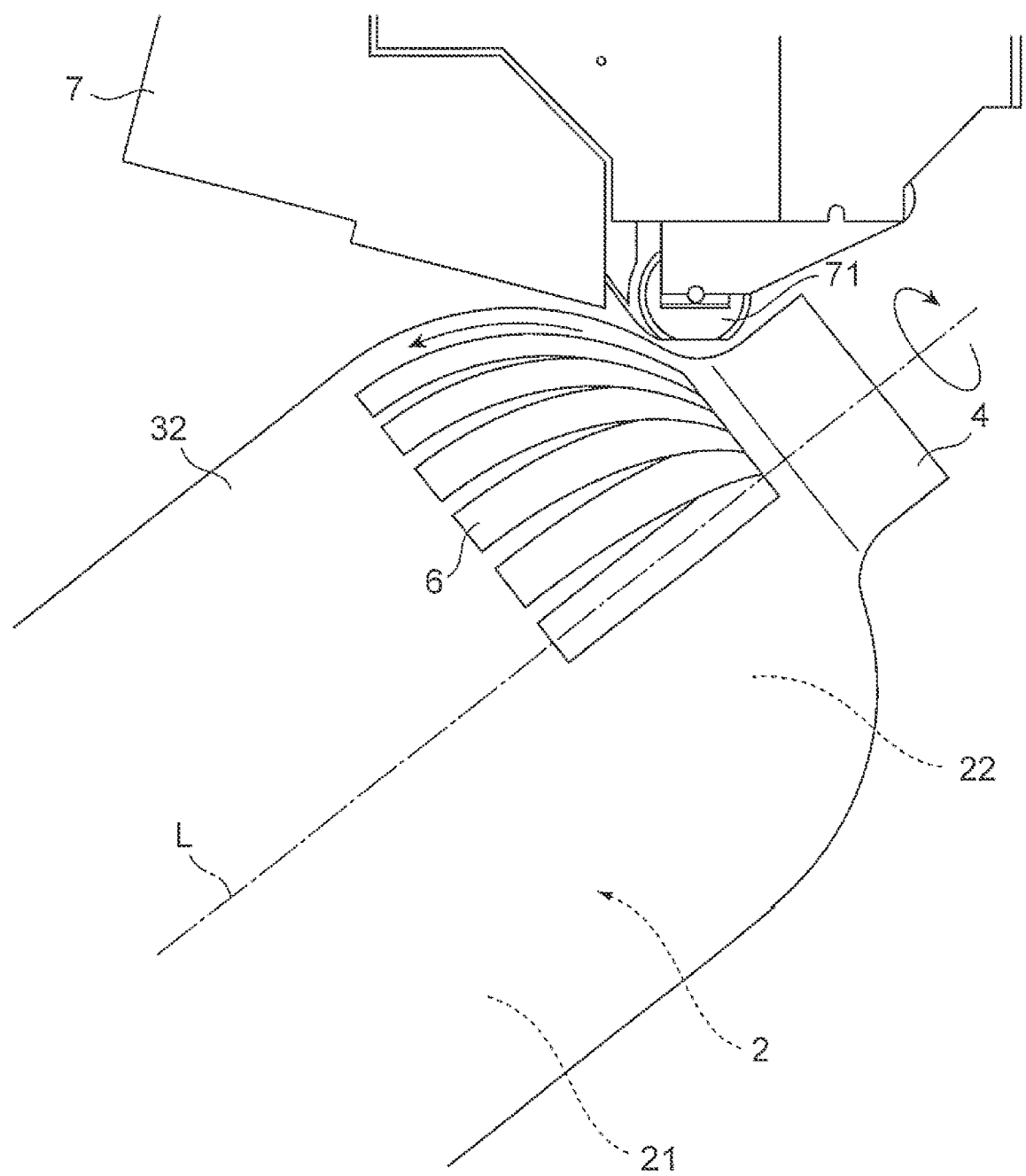
FIG. 5 is a schematic view illustrating a radial arrangement layer forming process.

Specifically, as illustrated in FIG. 5, the tapes 6 are applies to the surface of the helical layer 32 from the metal fitting 4 side toward the position of coupling between the barrel portion 21 and the first dome portion 22 using a tape placement device 7 while rotating the liner 2 on which the circumferential arrangement layer 31 and the helical layer 32 are formed. The tapes 6 are formed such that fibers of the fiber bundle are arranged in the longitudinal direction of the tapes 6. The tapes 6 are thermocompression-bonded to the surface of the helical layer 32 by a head 71 of the tape placement device 7 while being dispensed from the head 71.

Figure 6:
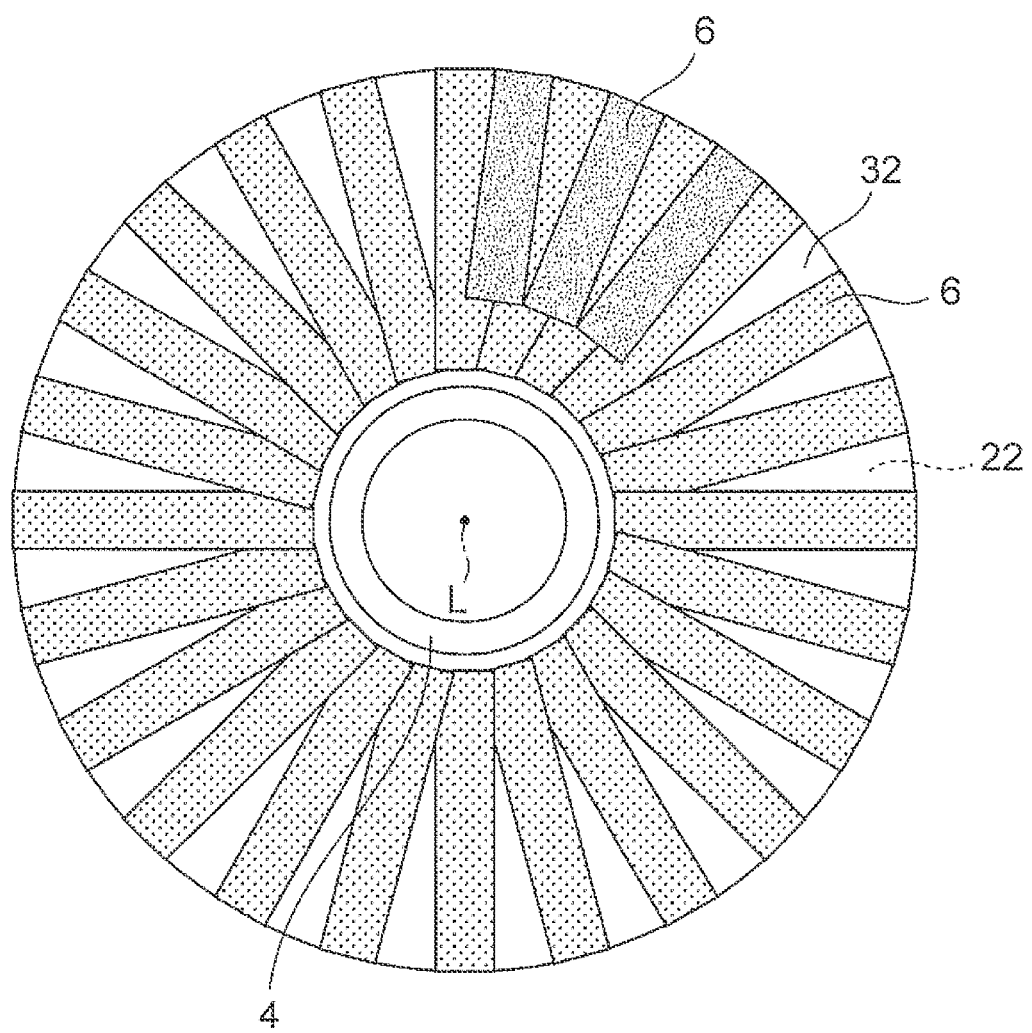
FIG. 6 illustrates how tapes are applied when seen in the axial direction of the tank.

FIG. 6 illustrates how tapes are applied when seen in the direction of the axis L of the tank 1. To apply the tapes 6 to the surface of the helical layer 32, as illustrated in FIG. 6, tapes 6 in a first layer are applied to the surface of the helical layer 32 radially such that the longitudinal direction of the tapes 6 extends from the metal fitting 4 side toward the position of coupling between the barrel portion 21 and the first dome portion 22. At this time, gaps are formed between adjacent tapes 6 because of the curved shape of the first dome portion 22. Next, tapes 6 in a second layer are applied onto the tapes 6 in the first layer so as to fill the gaps. In this manner, it is possible to form the first radial arrangement layer 33a in which fibers of the fiber bundle are arranged radially along the radial direction of the first dome portion 22 when seen in the direction of the axis L of the tank 1.

Next, a second radial arrangement layer 33b in which fibers of the fiber bundle are arranged radially along the radial direction of the second dome portion 23 when seen in the direction of the axis L of the tank 1 is formed at a position of the helical layer 32 corresponding to the second dome portion 23 by the same method as the method of forming the first radial arrangement layer 33a. The order in which the first radial arrangement layer 33a and the second radial arrangement layer 33b are formed is not limited to that described above, and the first radial arrangement layer 33a may be formed after the second radial arrangement layer 33b is formed.

The method of manufacturing the tank 1 according to the present embodiment includes the radial arrangement layer forming step S5 in which the first radial arrangement layer 33a is formed on the outer side of the helical layer 32 at a position corresponding to the first dome portion 22 and the second radial arrangement layer 33b is formed at a position corresponding to the second dome portion 23. The first radial arrangement layer 33a and the second radial arrangement layer 33b are formed using the radial arrangement layer forming step S5. Consequently, the first dome portion 22 and the second dome portion 23 can be reinforced, and it is not necessary to form the helical layer 32 on the barrel portion 21 along with formation of the helical layer 32 for reinforcing the dome portions. That is, since the first radial arrangement layer 33a can be formed in the radial arrangement layer forming step S5 to reinforce the first dome portion 22, and the second radial arrangement layer 33b can be formed in the radial arrangement layer forming step S5 to reinforce the second dome portion 23, it is possible to reduce the amount of the fiber reinforced resin to be used compared to when the dome portions are reinforced only by the helical layer, for example.

In the radial arrangement layer forming step S5 in which the tape placement method is used, the first radial arrangement layer 33a and the second radial arrangement layer 33b can be formed easily compared to the FW method. Further, the first radial arrangement layer 33a and the second radial arrangement layer 33b are formed by thermocompression bonding of the tapes 6 formed from a fiber reinforced resin. Therefore, the thermosetting resin with which the fiber bundle of the tapes 6 is impregnated can be cured at the same time as the tapes 6 are applied. As a result, the first radial arrangement layer 33a and the second radial arrangement layer 33b can be formed efficiently. In the present embodiment, the tapes 6 are applied by thermocompression bonding in the radial arrangement layer forming step S5. In the radial arrangement layer forming step S5, however, the thermosetting resin with which the fiber bundle of the tapes 6 is impregnated may be thermally cured after the tapes 6 are applied, rather than being subjected to thermocompression bonding.

Second Embodiment

A tank 1A according to a second embodiment will be described below with reference to FIG. 7. The tank 1A according to the second embodiment differs from the first embodiment in that the radial arrangement layers 33a, 33b are formed on the inner side of the helical layer 32 (on the side closer to the liner 2). The difference will be mainly described.

Figure 7:
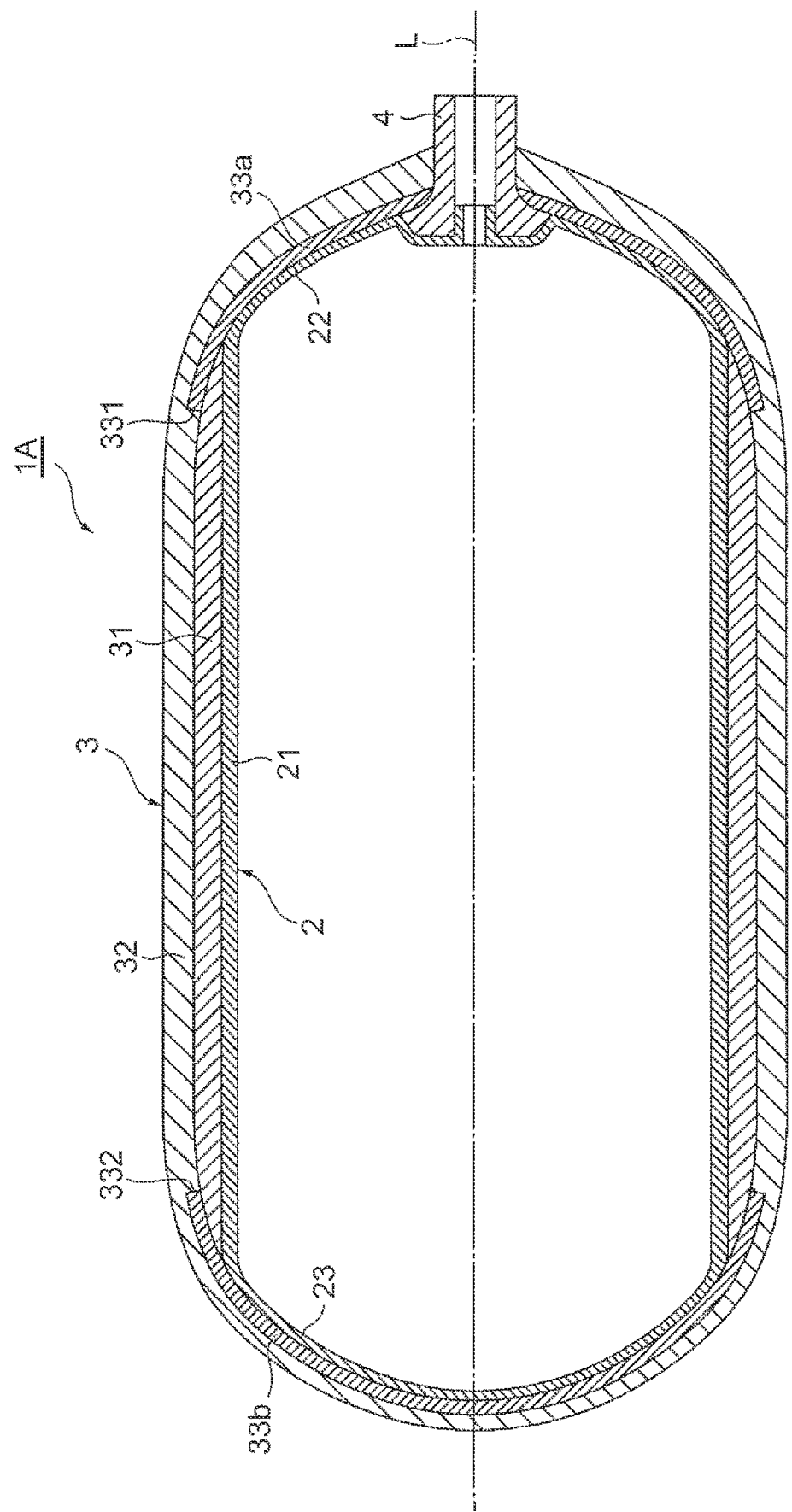
FIG. 7 is a schematic sectional view illustrating the structure of a tank according to a second embodiment.

Specifically, as illustrated in FIG. 7, the first radial arrangement layer 33a is formed on the outer peripheral surface of the first dome portion 22 of the liner 2 so as to cover the first dome portion 22. The first radial arrangement layer 33a has a dome shape, at the center portion of which an opening portion for exposing the metal fitting 4 is provided. The first radial arrangement layer 33a includes an expanded end portion 331 on the opposite side of the opening portion. The expanded end portion 331 extends to a position of coupling between the first dome portion 22 and the barrel portion 21. In a preferable example, the expanded end portion 331 extends beyond the position of coupling between the first dome portion 22 and the barrel portion 21 so as to cover a part of the circumferential arrangement layer 31.

Meanwhile, the second radial arrangement layer 33b is formed on the outer peripheral surface of the second dome portion 23 so as to cover the second dome portion 23. The second radial arrangement layer 33b has a dome shape. The second radial arrangement layer 33b includes an expanded end portion 332. The expanded end portion 332 extends to a position of coupling between the second dome portion 23 and the barrel portion 21. In a preferable example, the expanded end portion 332 extends beyond the position of coupling between the second dome portion 23 and the barrel portion 21 so as to cover a part of the circumferential arrangement layer 31.

The helical layer 32 is disposed on the outermost side of the tank 1A, and formed so as to cover the circumferential arrangement layer 31, the first radial arrangement layer 33a, and the second radial arrangement layer 33b.

With the tank 1A according to the second embodiment, the same effect and function as those of the first embodiment discussed above can be obtained. In the tank 1A according to the second embodiment, the first radial arrangement layer 33a and the second radial arrangement layer 33b are disposed on the inner side of the helical layer 32. Therefore, an effect of enhancing the adhesion between the first radial arrangement layer 33a and the first dome portion 22 and an effect of enhancing the adhesion between the second radial arrangement layer 33b and the second dome portion 23 can be further expected.

To manufacture the thus configured tank 1A, a circumferential arrangement layer 31 to cover the barrel portion 21 of the liner 2 is formed. Next, a first radial arrangement layer 33a to cover the first dome portion 22 and a second radial arrangement layer 33b to cover the second dome portion 23 are formed by the tape placement method. Next, a helical layer 32 to cover the circumferential arrangement layer 31, the first radial arrangement layer 33a, and the second radial arrangement layer 33b is formed. In this case, the first radial arrangement layer 33a and the second radial arrangement layer 33b are formed by thermocompression bonding of tapes 6 to the respective outer peripheral surfaces of the first dome portion 22 and the second dome portion 23. Therefore, the liner 2 is preferably made of metal (e.g. aluminum) from the viewpoint of reliably achieving thermocompression bonding of the tapes 6.

Third Embodiment

A tank 1B according to a third embodiment will be described below with reference to FIG. 8. The tank 1B according to the third embodiment differs from the first embodiment in further including protectors 8a, 8b disposed on the outer side of the radial arrangement layers 33a, 33b. The difference will be mainly described.

Figure 8:
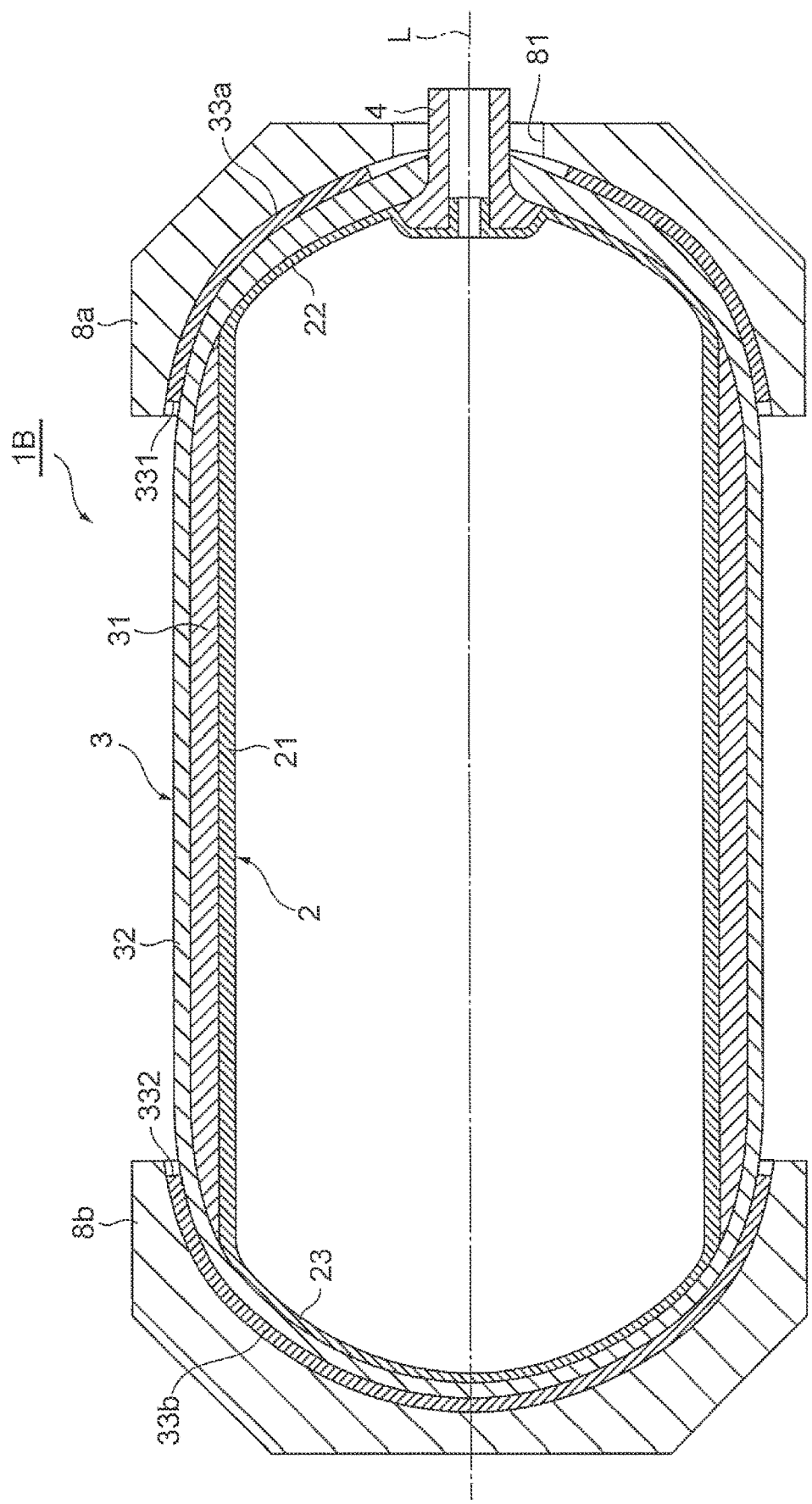
FIG. 8 is a schematic sectional view illustrating the structure of a tank according to a third embodiment.

Specifically, as illustrated in FIG. 8, the protectors 8a, 8b are disposed at both end portions of the tank 1B in the direction of the axis L. The protector 8a is disposed on the outer side of the first radial arrangement layer 33a. The protector 8b is disposed on the outer side of the second radial arrangement layer 33b.

The protectors 8a, 8b are protection members, and protect the tank 1B from an impact from the outside, and protect the tank 1B from a stress due to the internal pressure of the tank 1B. The protector 8a is fixed to the first radial arrangement layer 33a. The protector 8b is fixed to the second radial arrangement layer 33b. The protector 8a has an opening portion 81 that allows the metal fitting 4 to be inserted therethrough. The protectors 8a, 8b are formed from a resin material with impact resistance properties, for example.

With the tank 1B according to the third embodiment, the same effect and function as those of the first embodiment discussed above can be obtained, and the impact resistance properties of the tank 1B can be improved by further providing the protectors 8a, 8b.

As with the method of manufacturing the tank 1 according to the first embodiment, the method of manufacturing the tank 1B includes a liner forming step S1, a circumferential arrangement layer forming step S2, a helical layer forming step S3, a curing step S4, and a radial arrangement layer forming step S5. The radial arrangement layer forming step S5 of the method of manufacturing the tank 1B differs from that of the method of manufacturing the tank 1 according to the first embodiment. The difference will be mainly described below.

Figure 9:
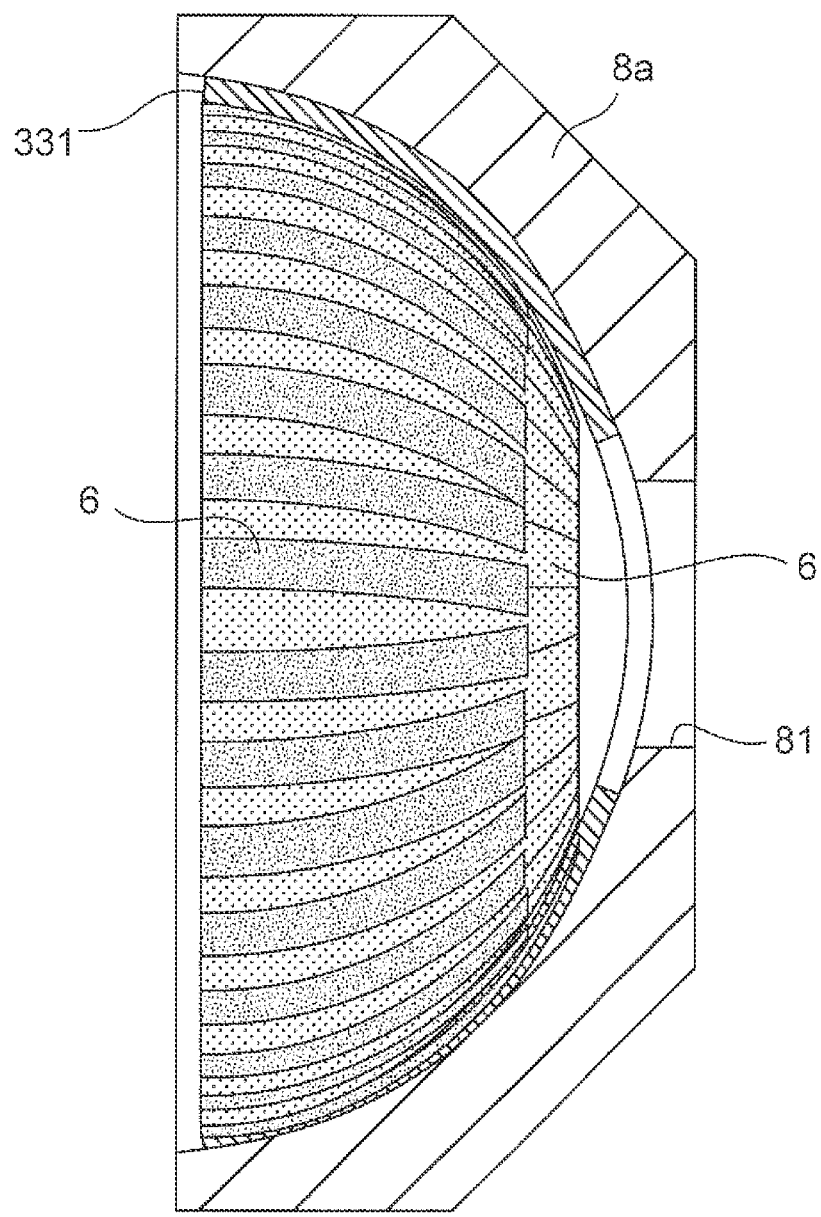
FIG. 9 is a schematic sectional view illustrating application of tapes to the inner surface of a protector.
Figure 10:
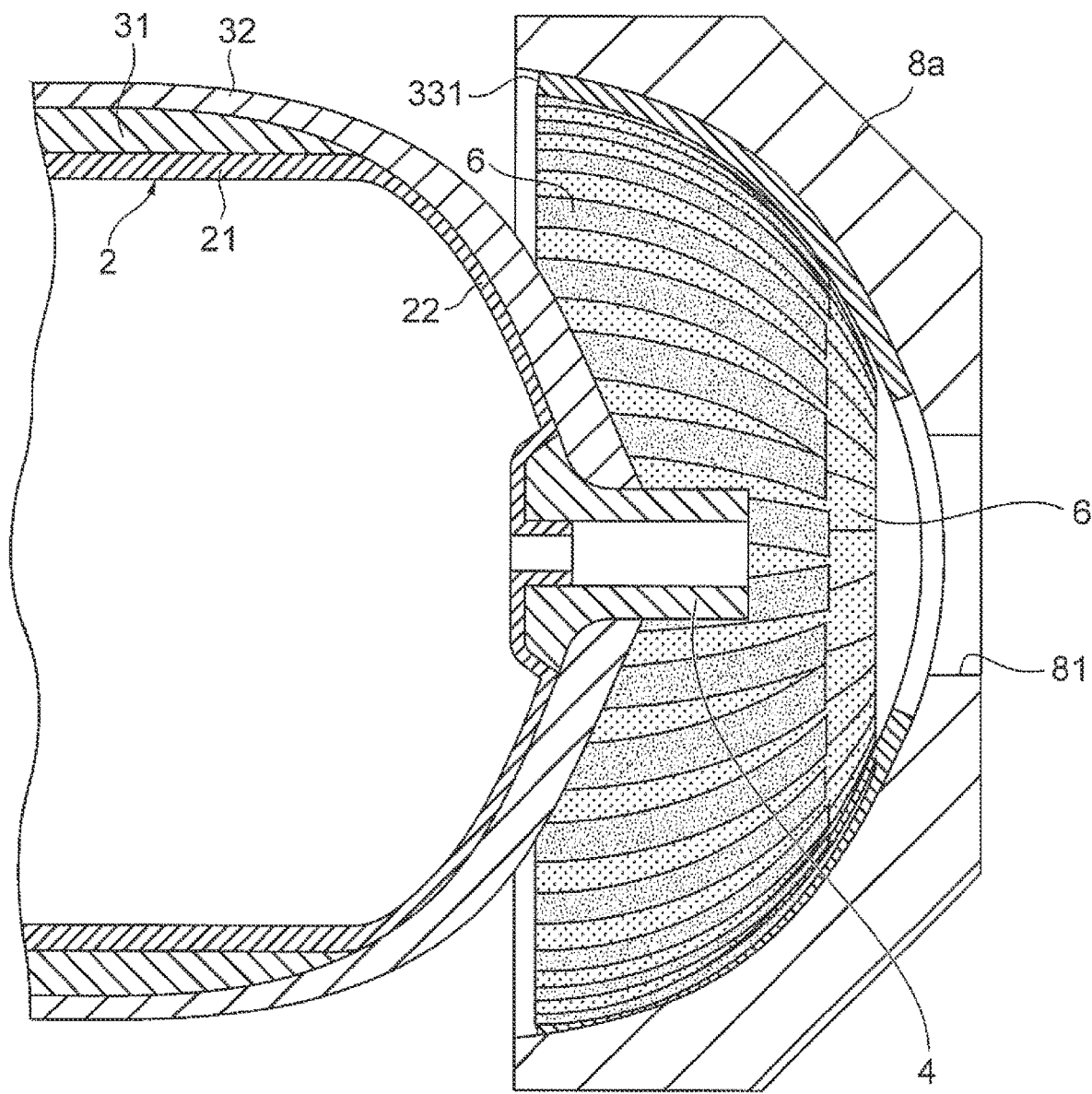
FIG. 10 is a schematic sectional view illustrating how the protector is mounted.

Specifically, in the radial arrangement layer forming step S5 of the method of manufacturing the tank 1B, first, tapes 6 are applied to the inner surface of a protector 8a formed in advance by resin molding (see FIG. 9). The tapes 6 are applied by the tape placement method. Fibers of the fiber bundle of the tapes 6 applied to the inner surface of the protector 8a are arranged radially along the radial direction of the first dome portion 22 when seen in the direction of the axis L of the tank 1B to be manufactured. Subsequently, the protector 8a to which the tapes 6 are applied is mounted to the outer side of the liner 2 (see FIG. 10). More particularly, the protector 8a to which the tapes 6 are applied is mounted to the helical layer 32 at a position corresponding to the first dome portion 22. Subsequently, the mounted protector 8a and the tapes 6 are heated to cure the thermosetting resin with which the fiber bundle of the tapes 6 is impregnated.

The thermosetting resin (e.g. epoxy) in the tapes 6 is cured to permeate between the tapes 6 and the helical layer 32. Consequently, the protector 8a can be bonded to the helical layer 32. As a result, the first radial arrangement layer 33a can be formed, and the protector 8a can be fixed to the liner 2 on which the circumferential arrangement layer 31 and the helical layer 32 are formed.

Next, a protector 8b can be fixed to the helical layer 32 by the same method as the method of fixing the protector 8a to the helical layer 32. Tapes 6 are applied to the inner surface of the protector 8b. The protector 8b to which the tapes 6 are applied is mounted to the helical layer 32 at a position corresponding to the second dome portion 23. The thermosetting resin with which the fiber bundle of the tapes 6 is impregnated is cured. Consequently, a second radial arrangement layer 33b is formed. In addition, the protector 8b is bonded and fixed to the liner 2 on which the circumferential arrangement layer 31 and the helical layer 32 are formed.

In the radial arrangement layer forming step S5 of the method of manufacturing the tank 1B according to the third embodiment, the tapes 6 formed from a fiber reinforced resin are applied to the inner surface of the protectors 8a, 8b formed in advance by resin molding. Fibers of the fiber bundle of the tapes 6 are arranged radially along the radial direction of the first dome portion 22 or the second dome portion 23 when seen in the direction of the axis L of the tank 1B to be manufactured. After the protectors 8a, 8b to which the tapes 6 have been applied are mounted to the outer side of the liner 2, the thermosetting resin with which the fiber bundle is impregnated is heated to be cured. In this manner, it is possible to fix the protectors 8a, 8b to the liner 2 at the same time as the first radial arrangement layer 33a and the second radial arrangement layer 33b are formed. Therefore, it is possible to reduce the number of man-hours for manufacture compared to when the formation of the radial arrangement layers 33a, 33b and the fixation of the protectors 8a, 8b are performed separately. The adhesion between the protectors 8a, 8b and the liner 2 can be secured compared to when the formation of the radial arrangement layers 33a, 33b and the fixation of the protectors 8a, 8b are performed separately.

While the embodiments of the present disclosure have been discussed in detail above, the present disclosure is not limited to the embodiments discussed above, and a variety of design changes can be made without departing from the scope of the present disclosure.

What is claimed is:

1. A tank comprising:
   a liner that includes a barrel portion having a cylindrical shape and a pair of dome portions provided at both ends of the barrel portion in an axial direction; and
   a reinforcing layer that covers the liner and that includes a fiber reinforced resin formed by impregnating a fiber bundle with a resin, wherein
   a portion of the reinforcing layer that covers the dome portions includes a radial arrangement layer in which fibers of the fiber bundle are arranged radially along a radial direction of the dome portions when seen in a direction of an axis of the tank,
   the reinforcing layer includes
      a circumferential arrangement layer that covers the barrel portion and in which fibers of the fiber bundle are arranged in a circumferential direction of the tank, and
      a helical layer that covers the circumferential arrangement layer and the dome portions,
   the radial arrangement layer is disposed on an outer side of a portion of the helical layer that covers the dome portions, and
   a total length of the radial arrangement layer in the direction of the axis of the tank is shorter than a length of the tank in the direction of the axis of the tank.

2. The tank according to claim 1, wherein a protector is disposed on an outer side of the radial arrangement layer.

3. A method of manufacturing a tank, comprising:
   forming a liner that includes a barrel portion having a cylindrical shape and a pair of dome portions provided at both ends of the barrel portion in an axial direction; and
   forming a reinforcing layer that covers the liner using a fiber reinforced resin formed by impregnating a fiber bundle with a resin, wherein the forming of the reinforcing layer includes forming a radial arrangement layer on an outer side of the dome portions, in which fibers of the fiber bundle are arranged radially along a radial direction of the dome portions when seen in an axial direction of the tank, the forming of the reinforcing layer includes forming a circumferential arrangement layer that covers the barrel portion and in which fibers of the fiber bundle are arranged in a circumferential direction of the tank, and forming a helical layer that covers the circumferential arrangement layer and the dome portions, the forming of the radial arrangement layer includes forming the radial arrangement layer on an outer side of the helical layer at positions to cover the dome portions, and a total length of the radial arrangement layer in the direction of the axis of the tank is shorter than a length of the tank in the direction of the axis of the tank.

4. The method of manufacturing a tank according to claim 3, wherein the radial arrangement layer is formed by a tape placement method.

5. The method of manufacturing a tank according to claim 4, wherein the radial arrangement layer is formed by thermocompression bonding of tapes formed from the fiber reinforced resin.

6. The method of manufacturing a tank according to claim 3, wherein:

the tank includes a protector disposed on an outer side of the radial arrangement layer; and the forming of the radial arrangement layer includes applying tapes formed from the fiber reinforced resin to an inner surface of the protector fabricated in advance, such that fibers of the fiber bundle are arranged radially along a radial direction of the dome portions when seen in a direction of an axis of the tank to be manufactured, mounting the protector, to which the tapes have been applied, to an outer side of the liner, and curing the resin with which the fiber bundle is impregnated.

* * * * *